Patented Oct. 29, 1935

2,018,767

UNITED STATES PATENT OFFICE 2,018,767

PYROXYLIN SOLUTION

William Seaman, Brooklyn, N. Y., assignor to Standard Oil Development Company, a corporation of Delaware No Drawing. Application August 3, 1931, Serial No. 554,941

14 Claims. (Cl. 134—79)

This invention relates to new and useful pyroxylin solvents which are organic compounds similar to the known oxygenated solvents for pyroxylin but having one or more oxygen atoms substituted by one or more sulfur atoms in the molecule and most especially to those compounds where a sulfur atom is linked to two carbon atoms as in the thio-ethers and thio-esters.

There are many known oxygenated organic substances which are either solvents alone for pyroxylin or which show solvent action in suitable mixtures, such as ethers, ketones, esters, esterified phenols, cellosolve esters, alkyl ethers of ethylene glycol, di-acetone alcohols, and many other substances. I have now found that compounds of the above types having sulfur substituted for one or more atoms of oxygen therein are also either suitable solvents alone for pyroxylin or may be used in suitable mixtures as solvents for this substance. Such compounds may be readily prepared from the mercaptans occurring in petroleum and its distillation and destructive distillation products and hence this invention makes available large quantities of new and cheap solvents. The mercaptans such as amyl, butyl and lighter mercaptans are soluble in aqueous alkaline solutions such as caustic soda and may be readily removed from hydrocarbon oils by such solutions. Heavier mercaptans are preferentially soluble in the oils. The complex mixtures of thio-ethers and other organic sulfur compounds of the types mentioned herein may be prepared from these mercaptans by known synthetic methods. For example, the thio-ethers may be prepared as described in the co-pending application No. 585,156, filed January 6, 1932, by Seaman and Hoffman, in which mercaptan vapors are passed over suitable catalysts and are converted into a complex mixture of thio-ethers corresponding substantially to the mercaptans treated. Redistilled fractions of these complex mixtures or the mixtures themselves are suitable as solvents without separation into their individual constituents, many of which have not been separated or identified.

A characteristic formula for the purpose of this invention may be represented as

R—S—R' in which the letters R and R' may represent organic radicals such as alkyl, aryl, acyl, or similar substituted radicals.

These solvent compounds may be used either alone or mixed according to their respective solvent properties or they may be used in the ordinary formulas for pyroxylin solutions suitable for use in the preparation of lacquers, sheets, films, varnishes, artificial fibres and the like in which they generally may represent the corresponding oxygenated compounds. For example, thio-esters are suitable solvents alone for pyroxylin and are similar in this respect to the oxygenated esters now in use. The lower boiling esters such as methyl, ethyl and propyl thio-esters are suitable liquid solvents while the very heavy esters too high boiling to form desirable solutions may be used as plasticizers, for example ethyl thio-acetate dissolves one-half second cellulose nitrate very readily to form a clear solution. The thio-ethers also correspond generally to the ordinary ethers containing oxygen and resemble the latter in that they require the addition of a small amount of alcohol or other suitable "solvent aids" to be suitable as pyroxylin solvents. The heavier alcohols such as propyl, iso-propyl and secondary butyl alcohols may be used in admixture with methyl thio-ether to form solvents for pyroxylin but the heavier thio-ethers require lighter alcohols and only methyl alcohol may be used with n-propyl and higher thio-ethers. Absolute ethyl alcohol is preferred with phenyl thio-ether and with other aryl thio-ethers to form pyroxylin solvents. Ethyl alcohol may also be used with ethyl thio-ether.

The following formulas are examples in which my solvents are substituted for ethyl acetate in standard lacquers but it is understood that my invention is not to be limited thereto. The proportions are parts by weight.

(1) This formula represents a spray lacquer.

|  | Part |
|---|---|
| Benzol | 1 |
| n-butyl acetate | 2 |
| Ethyl thio-ether | 2 |
| Cellulose nitrate | 0.5 |
| Castor oil | 0.3 |

(2) This represents a bronzing liquid.

|  | Part |
|---|---|
| Cellulose nitrate | 0.88 |
| Ethyl thio-ether | 2.54 |
| Acetone | 1.12 |
| n-butyl acetate | 0.60 |
| Ethyl alcohol | 1.12 |
| Benzol | 3.10 |
| Toluene | 1.23 |

Ester gum solution of the following composition by weight: 2 parts ethyl thio-ether, 6 parts benzol, and 12 parts ester gum____ 0.3

(3) This represents a silver lacquer.

| | Parts |
|---|---|
| Benzol | 2.4 |
| Toluene | 2.3 |
| n-butyl alcohol | 1.1 |
| Amyl acetate | 1.2 |
| n-butyl acetate | 0.6 |
| Ethyl thio-ether | 1.8 |
| Cellulose nitrate | 0.6 |
| Dammar gum solution of the following composition by weight: 10.9 parts dammar gum, 6.2 parts methyl alcohol, 1.2 parts ethyl thio-ether, 1.2 parts acetone, and 5.6 parts benzol | 0.4 |

(4) This represents a brushing lacquer.

| | Parts |
|---|---|
| Cellulose nitrate | 0.9 |
| Solution of dammar gum described in (3) | 1.6 |
| Solution of 20 parts of shellac in 50 parts of ethyl alcohol | 0.6 |
| Ethyl thio-ether | 0.7 |
| Amyl acetate | 2.3 |
| n-butyl alcohol | 1.0 |
| Diethyl phthalate | 0.1 |
| Toluene | 33 |

The following formula represents a standard lacquer containing a thio-ester.

| | Gr. |
|---|---|
| Ethyl thio-acetate | 1.0 |
| Ethyl acetate | 2.0 |
| Benzene | 1.0 |
| Castor oil | 0.3 |
| Cellulose nitrate (½ second) | 0.5 |
| n-butyl acetate | 0.5 |

The resulting lacquer shows satisfactory drying properties.

It will be obvious from the above formulas that my solvents may be used generally in the known pyroxylin solutions with other substances possessing suitable solvent properties for pyroxylin and with the thinners or diluents such as benzol, toluol, or solvent naphtha and the like now in use and with such plasticizers, gums, resins, pigments and dyes as are generally used. Other substances may also be used with my solvents and pyroxylin according to the intended use of the solution as will be understood.

My invention is not to be limited to any illustrative examples nor to any theory of the solvent action of my solvents but only to the following claims in which I wish to claim all novelty.

I claim:

1. A new composition of matter comprising a solution containing a thio-ester of a fatty acid and pyroxylin.

2. A new composition of matter comprising a solution containing ethyl thio-acetate and pyroxylin.

3. A new composition of matter comprising a solution containing pyroxylin, a liquid di-alkyl thio-ether, and a suitable substance having a solvent action for pyroxylin when in admixture with ether containing oxygen.

4. A new composition of matter comprising a solution containing a volatile liquid di-alkyl thio-ether, an alcohol, and pyroxylin.

5. A new composition of matter comprising a solution containing a mixture of thio-ethers corresponding to the mercaptans of petroleum soluble in aqueous caustic soda, and pyroxylin.

6. A new composition of matter comprising a solution containing pyroxylin, an alcohol not heavier than butyl alcohol, and a thio-ether corresponding to the mercaptans of petroleum.

7. A new composition of matter comprising a solution containing pyroxylin, a mixture of thio-ethers corresponding to the mercaptans removed from petroleum oils in an aqueous alkaline solution, and a suitable substance having a solvent action for pyroxylin when in admixture with oxygen containing ethers.

8. A new composition of matter comprising a solution containing an alkyl thio-ether not heavier than n-propyl thio-ether, an alcohol not heavier than secondary butyl alcohol, and pyroxylin.

9. A new composition of matter comprising a solution containing n-propyl thio-ether, methyl alcohol, and pyroxylin.

10. A new composition of matter comprising a solution containing ethyl thio-ether, ethyl alcohol, and pyroxylin.

11. A new composition of matter comprising a solution containing methyl thio-ether, iso-propyl alcohol, and pyroxylin.

12. Composition of matter comprising pyroxylin and a solvent therefor containing an organic sulphur compound of the type R—S—R' in which R and R' represent separate alkyl or aryl radicals or acyl radicals of fatty acids.

13. Composition according to claim 12 in which the organic sulphur compound is a normally liquid compound.

14. Composition according to claim 12 in which the organic sulphur compound is a volatile normally liquid compound.

WILLIAM SEAMAN.